G. B. OKELL.
PREPARING PLUG-TOBACCO.
No. 194,949. Patented Sept. 4, 1877.
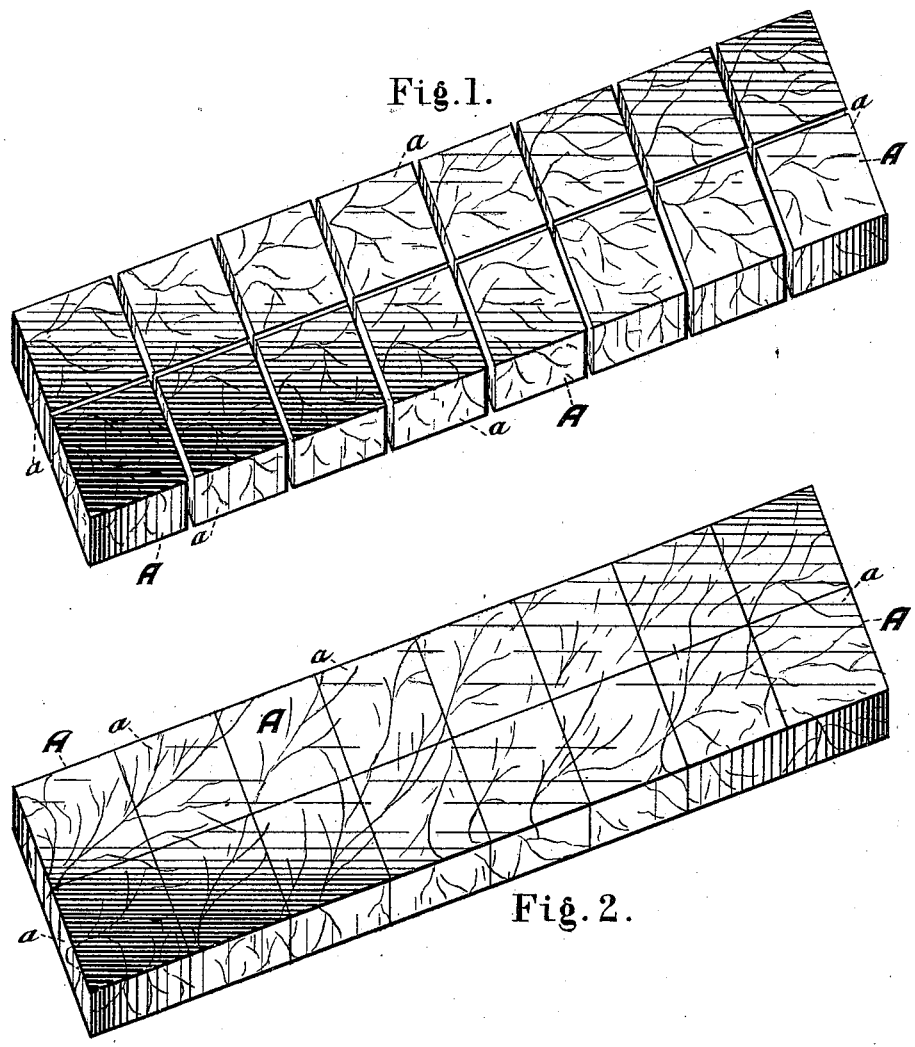

UNITED STATES PATENT OFFICE.

GEORGE B. OKELL, OF CHICAGO, ILLINOIS.

IMPROVEMENT IN PREPARING PLUG-TOBACCO.

Specification forming part of Letters Patent No. 194,949, dated September 4, 1877; application filed July 19, 1877.

*To all whom it may concern:*

Be it known that I, GEO. B. OKELL, of the city of Chicago, in the county of Cook and State of Illinois, have invented a new and useful Improvement in Preparing Tobacco-Plugs, which is fully described in the following specification, reference being had to the accompanying drawings, in which—

Figure 1 represents a perspective view of a tobacco-plug cut up into equal parts, the sections being separated slightly; and Fig. 2, a perspective view of same after the subdivisions have been pressed together to re-form a solid plug.

The object of my invention is to provide a plug for retail dealers from which small pieces may be readily separated for customers.

The invention consists in first cutting the lump or plug, prepared and pressed in the usual manner, into a certain number of subdivisions, and then re-pressing the plug, whereby the sections are caused to adhere to each other, and form again a single lump sufficiently solid for all practical purposes, but, at the same time, easily divided for retail sales.

In the drawings, A represents an ordinary lump or plug of tobacco cut up into subdivisions a, which, in Fig. 1, are represented slightly separated from each other, as they would appear after cutting. If this lump or plug weighs a pound, I prefer to cut it with seven transverse and one lateral cut, as shown in Fig. 1 of the drawings, whereby the plug will be divided into sixteen equal parts, the transverse cuts being at equal distances from each other, and the lateral one along the central line of the plug. Each of these sections a will, therefore, weigh one ounce, or, at least, sufficiently near that for all practical purposes. If the plug has some other weight, it is subdivided accordingly into sections of one or more ounces, as may be desired. The subdivided plug is then replaced in the press, being put between the ordinary plates and submitted to pressure, as in the usual process of forming the lump.

On account of the sticky ingredients contained in the lump, as well as the nature of the tobacco itself, the subdivisions a will be caused to adhere by this pressure, and be formed again into a tolerably solid lump, as shown in Fig. 2 of the drawings, in which the fine lines represent the lines of subdivision along which the sections adhere to each other.

The lump thus prepared is sufficiently strong for all ordinary purposes of transportation; but it can be easily broken up into the subdivisions by using a little force, or bending back and forth with the hands, and the breaks will always be along the old cuts in the plug. It is evident, therefore, that the retailer can easily break off one or two ounces from the lump, as desired by a customer, thereby saving all the annoyance of cutting, and, at the same time, insuring a perfectly fair division of the lump.

The cutting of the plug may be performed by any suitable apparatus, and the lump may be subdivided as above described; or the sections may be made larger, weighing two ounces each, or more, as may be desired.

Having thus described my invention, what I claim as new, and desire to secure by Letters Patent, is—

1. The herein-described method of preparing tobacco-plugs for retail trade, consisting in first cutting the pressed lump into subdivisions, and then re-forming the plug by re-pressing it, and causing the subdivisions to adhere or stick together temporarily, to form a single piece, substantially as and for the purpose set forth.

2. As a new article of manufacture, a plug of tobacco composed of a number of subdivisions of definite size and weight, stuck together, re-pressed, and adhering to each other by reason of said pressure, substantially as and for the purpose set forth.

GEO. B. OKELL.

Witnesses:
JNO. C. MACGREGOR,
W. C. CORLIES.